United States Patent [19]

Nakamura et al.

[11] Patent Number: 4,747,769
[45] Date of Patent: May 31, 1988

[54] INJECTION STRETCHING BLOW MOLDING MACHINE

[75] Inventors: Yoshinori Nakamura; Kouhei Koga, both of Nagano, Japan

[73] Assignee: Nissei ASB Machine Co., Ltd., Japan

[21] Appl. No.: 872,860

[22] Filed: Jun. 11, 1986

[30] Foreign Application Priority Data

Jun. 14, 1985 [JP] Japan .................................. 60-129372

[51] Int. Cl.⁴ ............................................. B29C 49/06
[52] U.S. Cl. .................................... 425/529; 264/532; 264/535; 264/538; 425/533; 425/540; 425/541
[58] Field of Search .............. 425/526, 529, 538, 539, 425/540, 541, 533; 264/532, 535, 538

[56] References Cited

U.S. PATENT DOCUMENTS

| | | | |
|---|---|---|---|
| 2,331,687 | 10/1943 | Hobson | 425/526 |
| 3,776,991 | 12/1973 | Marcus | 425/538 |
| 4,105,391 | 8/1978 | Aoki | 425/526 |

Primary Examiner—Jay H. Woo
Assistant Examiner—Timothy W. Heitbrink
Attorney, Agent, or Firm—Ostrolenk, Faber, Gerb & Soffen

[57] ABSTRACT

The present invention provides a new injection stretching blow molding machine in which supporting of a base plate is made possible from both peripheral edge portion and central portion of the base plate merely by chaning the shape of a rotary disk, and the number of tie bars for a mold clamping device may be increased to execute high pressure mold clamping.

14 Claims, 5 Drawing Sheets ced on the base plate, molds arranged between the machine bed

INJECTION STRETCHING BLOW MOLDING MACHINE

BACKGROUND OF THE INVENTION

1. Field of the Invention

This invention relates to a molding machine which continuously carries out a series of operations including injection molding of a parison, temperature control, and stretch blow molding of thin-walled containers such as bottles, cups, and the like.

2. Description of the Prior Art

An injection stretch blow molding machine disclosed in U.S. Pat. No. 4,105,391 has a rotary disk disposed on the undersurface of a base plate provided above a machine bed. The rotary disk transfers a parison and a molded product. This rotary disk is supported by a central rotary shaft connected to a driving device on the base plate and the peripheral edge of the base plate to thereby eliminate the provision of a central column which is essential to the molding machine as disclosed in U.S. Pat. No. 2,331,687.

No obstacle is therefor present between the machine bed and the base plate thereabove due to the omission of the central column, and a space formed thereat may be effectively used as a working space necessary for injection stretching blow molding. As a consequence, the aforesaid molding machine is smaller than a molding machine having a central column. Therefore, incorporation of various devices necessary for molding is made easy and moreover all the steps from injection molding of a parison to releasing of a molded product can be carried out under one and the same base plate.

With this, management of molding steps becomes easy, the molding cycle time is shortened, and thin-wall containers such as bottles, cups, etc. having uniform wall-thickness distribution may be produced in volume. However, in the aforementioned conventional molding machine, the base plate is supported only by the peripheral edge since the central column is omitted. If the diameter of the rotary disk is increased to accommodate a greater number of neck molds on the undersurface for volume production or if the wall thickness of the base plate in the injection operating stage is increased to effect high pressure clamping, the central portion of the base plate bends and this sometimes interferes with the horizontal rotation of the rotary disk.

Furthermore, since the mold clamping device provided at right angles to the base plate is arranged so that the injection mold may be positioned under the rotary disk, the mold clamping device cannot be guided by four tie bars, as in a conventional injection molding machine, and the position of the tie bars will be set externally of the rotary disk. In addition, the number and location of the tie bars is restricted to only opposite sides. Therefore, the guiding the mold clamping device is liable to be unstable, and moreover the clamping force is restricted. Many other problems arise as well.

These problems may be solved by increasing the number of support points for the base plate and of the tie bars. However, in the conventional construction wherein the rotary disk is held on the undersurface of the base plate, the number and location of support points is limited to only the peripheral edge. This makes it difficult to provide for the support in the central portion where it would be most effective with respect to the bending resulting from loads, and in addition, leaving no room for the increase of the tie bars.

SUMMARY OF THE INVENTION

This invention aims to solve the problems noted above with respect to prior art. An object of the present invention is to provide a new injection stretching blow molding machine which makes it possible to support the base plate from both the peripheral edge portion and at the central portion thereof and which allows the number of tie bars for carrying out the high pressure mold clamping to be increased.

A further object of the present invention is to provide an injection stretching blow molding machine which can arrange molding work operating stages of the same type at opposite positions on the base plate side so that when the rotary disk stops, molding operations may be carried out simultaneously.

Another object of the present invention is to provide an injection stretching blow molding machine for volume production in which a machine bed and a base plate are connected by independent supporting members without using tie bars for both the clamping device and supporting members for the base plate. The tie bars are used exclusively as connecting members for the mold clamping device, and the mold calmping device may be moved up and down along with the mold clamping device to carry out mold opening and closing, and mold clamping.

For achieving the objects as noted above, according to the present invention, there is provided a molding machine comprising a base plate arranged above a machine bed, a rotary disk rotatably provided on the undersurface of the base plate, the rotary disk being connected to an intermittently driving device on the machine bed side, neck molds mounted on the undersurface of the rotary disk, stop positions of the neck molds being provided for functioning as molding operating stages necessary for injection stretching blow molding, devices necessary for injection stretching blow molding installed on the base plate for the molding operating stages, and molds arranged between the machine bed and the base plate, said rotary disk being formed into an annular configuration, said machine bed and said base plate being connected by means of supporting members at the space internally of the rotary disk and at the outside the rotary disk.

According to the construction as described above, since the base plate is supported also at the central portion, bending due to the load does not easily occur. Since the rotary disk horizontally moves between the supporting members, even if the base plate is connected to the machine bed internally and externally of the rotary disk, the movement of the rotary disk is not impaired. Furthermore, even if the diameter of the rotary disk is increased in order to increase the number of molded products taken, the weight of the rotary disk is not increased materially since the central portion is a space, because of which the moving speed of the rotary disk need not be slowed down in consideration of the inertia which acts when the rotation thereof stops.

Moreover, the supporting members for the base plate can be provided independently or along with tie bars for the mold clamping device and blow device. The number of tie bars may be increased to enhance the guiding precision as well as mold clamping precision of the mold clamping disk.

BRIEF DESCRIPTION OF THE DRAWINGS

The drawings illustrate an injection stretching blow molding machine according to the present invention.

FIG. 5 is a plan view of the machine with the half of the base plate cutaway.

FIG. 6 is a side view thereof.

FIG. 7 is a longitudinal sectional side view of essential parts of the driving portion.

FIG. 8 is a fragmentary bottom view of the rotary disk.

DETAILED DESCRIPTION OF THE INVENTION

Figure 1:
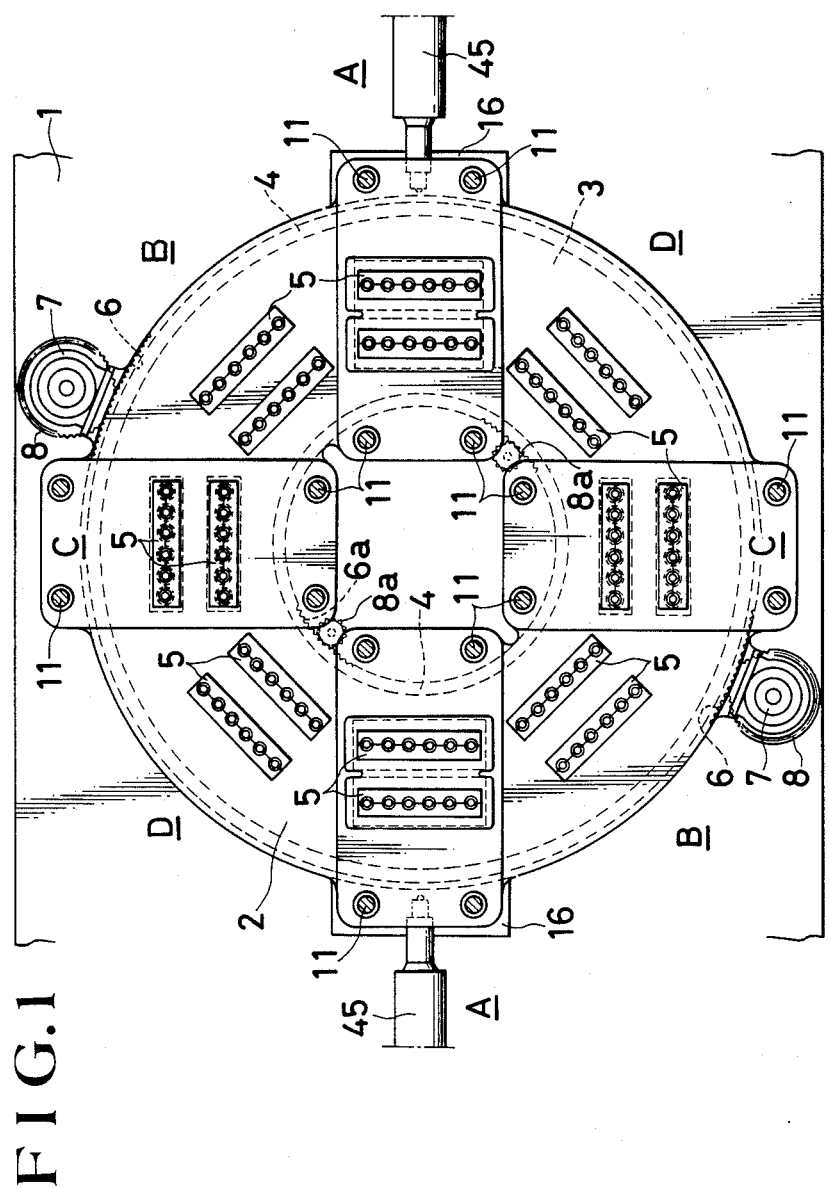
FIG. 1 is a plan view of the machine with a part of the base plate cutaway and with devices on the base plate removed.
Figure 2:
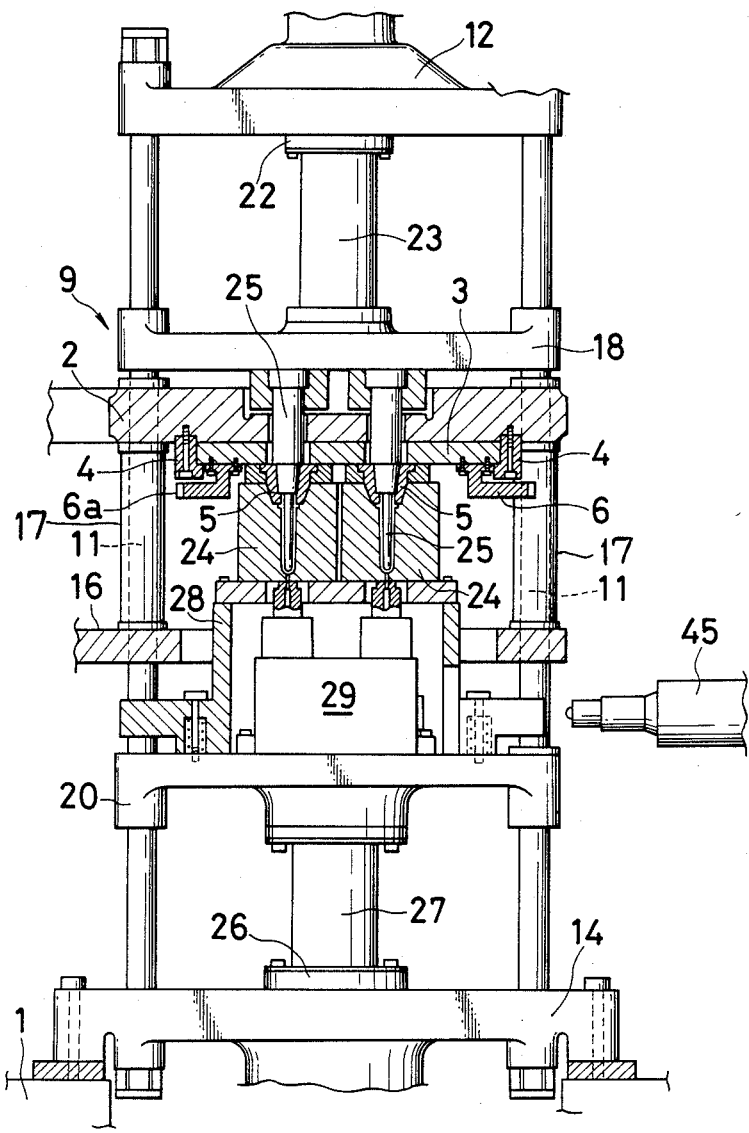
FIG. 2 is a longitudinal sectional side view of an injection operating stage.

In the drawings, reference numeral 1 designates a machine bed, and reference numeral 2 designates a circular base plate horizontally disposed above the machine bed. An annular rotary disk 3 is held and mounted on the undersurface of the base plate 2 by means of members 4, 4 with inner and outer edges thereof secured to the side of the base plate.

Neck molds 5, 5 capable of being opened and closed in a radial direction are mounted at eight places of the undersurface of the rotary disk 3, and a gear 6 for rotation is provided along the outer edge of the rotary disk on the undersurface of the rotary disk externally of the neck molds 5, 5.

The aforesaid gear 6 is meshed with a gear 8 of a electrically or hydraulically operated driving device 7 installed at a position opposite the base plate 2, and the driving device 7 is provided with an intermittently moving means, not shown, for rotating the rotary disk 2 every 45°. Reference numeral 6a designates a guide gear, which is meshed with a gear 8a provided along the inner edge of the rotary disk.

Stop positions of the neck molds 5, 5 are used for an injection operating stage A, a temperature control operating stage B, a stretching blow operating stage C and a taking out operating stage D, respectively, the injection operating stage A and the stretching blow operating stage C having mold clamping devices 9, 10 provided vertically. The mold clamping devices 9, 10 are constructed such that upper fixing members 12, 13 and lower fixing members 14, 15 mounted on the machine bed 1 are connected by means of tie bars 11, 11, the tie bars extending through the base plate 2 internally and externally of the rotary disk 3, being positioned between a plate member 16 and the base member 2 arranged over the injection operating stages A, A, and supporting the base plate 2 by supporting members 17 inserted into the tie bars 11, 11.

The tie bars 11, 11 have upper mold clamping plates 18, 19 and lower mold clamping plates 20, 21 inserted therethrough. Connected to the upper mold clamping plate 18 in the injection operating stage A is an injection core 25 which extends through a ram 23 of a mold clamping cylinder 22 provided on the upper fixing member 12, the base plate 2 and the rotary disk 3 and is positioned at a cavity of an injection mold 24 from the neck mold 5.

Connected to the lower mold clamping plate 20 are a ram 27 of a mold clamping cylinder 26 provided on the lower fixing member 14 and a tray 28 of the injection mold 24, the tray 28 internally having a hot runner block 29 which is secured to the lower mold clamping plate 20.

Connected to the upper mold clamping plate 19 in the stretching blow operating stage C are rods 31 of a mold clamping cylinder 30 mounted on the upper fixing member 13 and a blow core 33 which extends through the base plate 2 and the rotary disk 3 and is positioned at a cavity of the blow mold 32 from neck mold 5. On upper mold clamping plate 19 there is a member 35 for moving up and down a stretching rod 34 within a blow core and an air cylinder 36 and a rod 37 for moving member 35 vertically. Reference numeral 38 designates a supporting block for the blow core.

Connected to the lower mold clamping plate 21 is a ram 40 of a mold clamping cylinder 39 provided on the lower fixing member, and the blow mold 32 is installed on the plate along an opening and closing device 41.

The opening and closing device 41 comprises a pair of fixed plates 40, 42 secured to both sides on the upper surface of the lower mold clamping plate 21, hydraulically operated cylinders 43, 43 provided over both the fixed plates, and rods 44, 44 for opening and closing the blow mold 32 in a radial direction of the base plate 2.

A temperature control core device and a mold opening device, not shown, are provided on the base plate 2 for temperature control at operating stage B and the taking out operating stage D, and a temperature control mold is provided between the machine bed 1 and the base plate 2 for temperature control at operating stage B.

In the molding machine having the construction as described above, injection devices 45, 45 are arranged in the injection operating stages A, A so that parisons 46 may be subjected to injection molding at two places simultaneously. The molded parison 46 is transferred by rotary disk 3, which rotates and moves along the undersurface of the base plate 2, to the temperature control operating stage B and the stretching blow operating stage C while being held by neck molds 5. A hollow molded product 47 molded at the stretching blow operating stage C is transferred to the taking out operating stage D. Operation of the devices in various operating stages is made in a manner similar to that of the conventional construction and the hollow molded products 47 are taken out at two places every movement of rotary disk 3.

As described above, the rotary disk 3 of the present invention is on the undersurface of the base plate and is annularly formed. Four tie bars are positioned internally and externally, respectively, of the rotary disk and these extend through the base plate for the injection operating stage and the stretching blow operating stage, and the mold clamping device is vertically supported by the tie bars.

Therefore, the apparatus of the present invention is sufficiently sturdy to withstand the high pressure of the mold clamping force. The invention makes it possible to carry out the injection molding of parisons which have a projected area at a mouth portion thereof which is large. It allows stretch blow molding of containers such as wide-mouth bottles.

Moreover, since mold clamping is provided also in the stretching blow operating stage, the high pressures of blowing molding associated with mold opening and closing can be accomplished easily. Moreover, since the mold clamping plates in the mold clamping devices, molds and the like are guided by four tie bars, the precision of the mold clamping is further enhanced.

FIGS. 5 to 8 show another embodiment of the present invention, which is different from the aforementioned embodiment shown in FIGS. 1 to 4 in the construction of the rotary disk, the supporting means and the mold clamping device.

Figure 5:
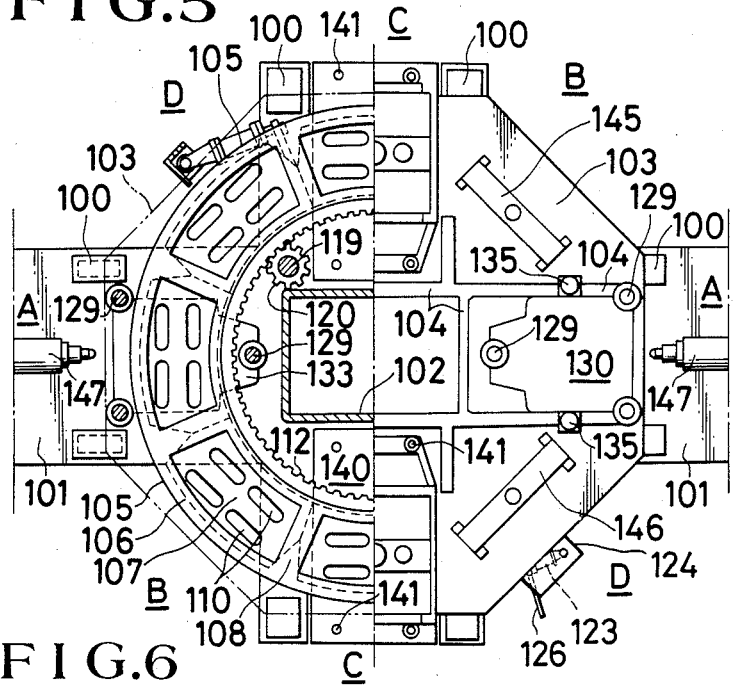
FIGS. 5 to 8 show other embodiments of the present invention.
Figure 6:
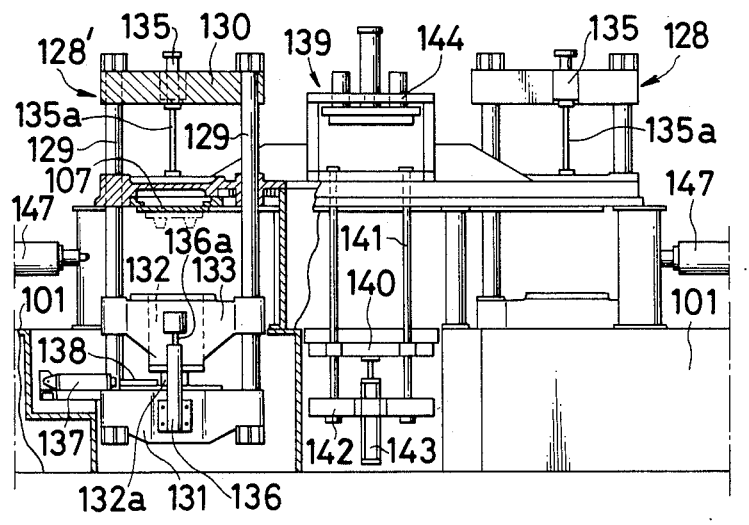

In this embodiment, as shown in FIGS. 5 and 6, a respective pair of prismatic supporting members 100 are arranged on a machine bed 101 for the injection operating stage A and the stretching blow operating stage C, a supporting base 102 in the form of a frame is provided in the central portion of the machine bed 101, and a base plate 103 having its periphery formed into an octagon is supported on and secured to the upper portion of the machine bed 101 by the supporting base 102 and the supporting members 100.

The central portion of the base plate 103 is in the form of a square space portion, and a rib 104 is integrally formed from the periphery of the space portion to the base plate of both the injection operating stage A.

A rotary disk 105 comprises an annular body 106, and eight steel sheets 107 bolted to the lower surface of the annular body 106. The annular body 106 is constructed so that an inner ring and an outer ring are connected by means of arms 108 in predetermined spaced relation so as to reduce the weight, and the steel plate 107 is mounted from the arm 108 to the undersurfaces of the inner and outer rings, as shown in FIG. 8.

Figure 3:
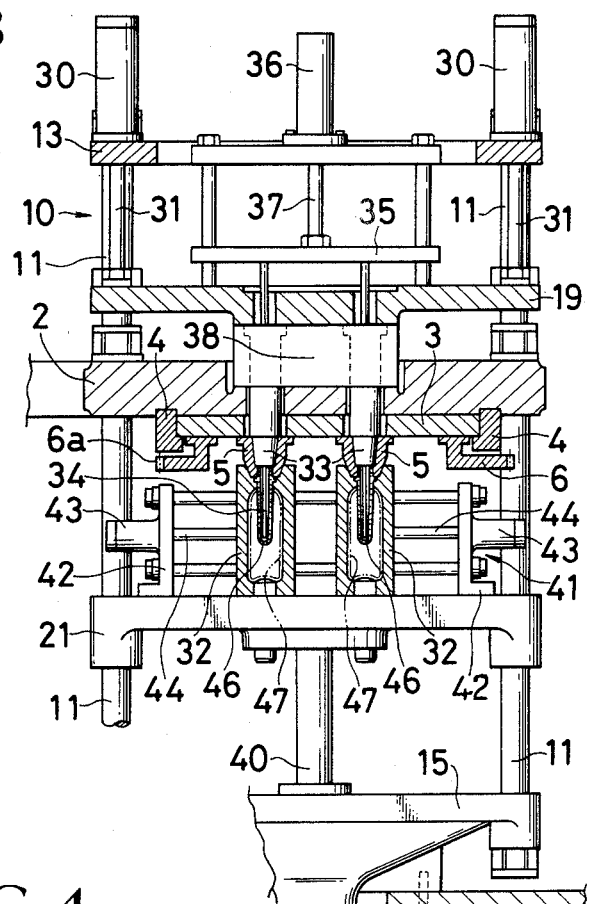
FIG. 3 is a longitudinal sectional side vice of a stretching blow operating stage.
Figure 4:
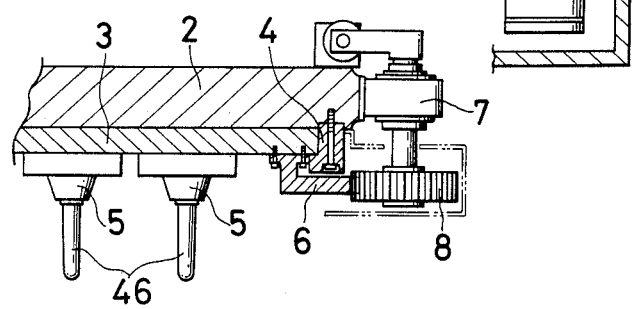
FIG. 4 is a longitudinal sectional side view of a part of a driving portion.
Figure 7:
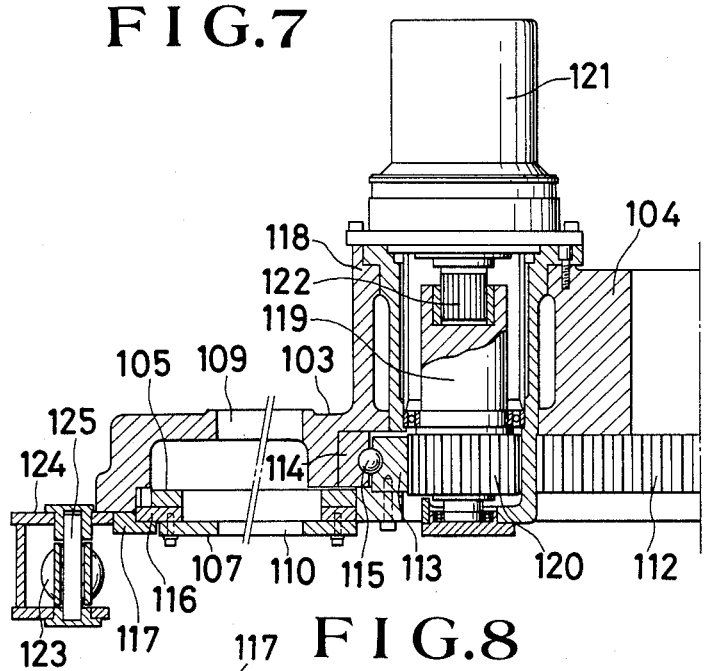
Figure 8:
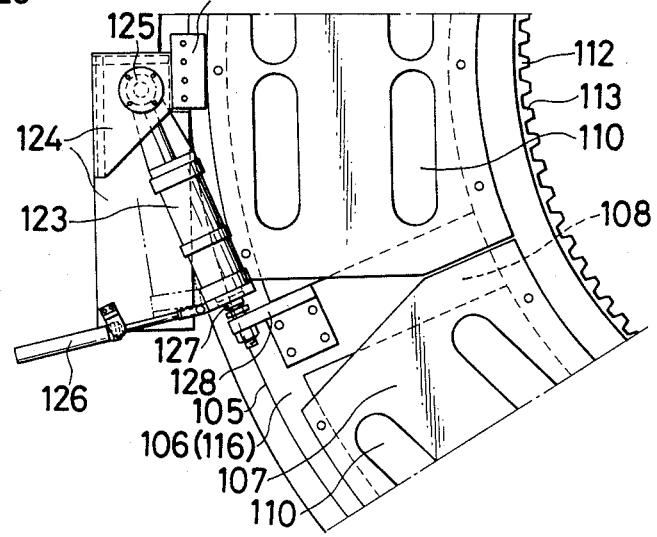

The surface of the steel sheet 107 is bored with two rows of slots 110 in a tangential direction, the slots being positioned directly under a core insert hole 109 bored in the base plate 103 (see FIGS. 7 and 8). A plurality of neck molds similar to those shown in FIG. 3 are mounted on the undersurface of the steel plate 107.

An annular rack 113 serving as an internal gear 112 of the rotary disk 105 is mounted on the inner ring of the annular body 106. A ball bearing 115 is provided between the back of the annular rack 113 and an annular guide metal 114 provided on the undersurface of a base plate. The outer ring of the annular body 106 is held on a holder 117 mounted on the undersurface of the peripheral edge of the base plate 103 through a member 116 and adapted to be moved on the upper surface of the holder 117.

The aforesaid internal gear 112 is meshed with a gear 120 provided on a rotary shaft 119 within a supporting tube 118 mounted on the base plate 103, the rotary shaft 119 being connected to a driving shaft 122 of an electrically or hydraulically operated driving device 121 mounted on the upper portion of the supporting sleeve 118.

A shock absorber 123 for the rotary disk 105 is rotatably mounted by means of a shaft 125 on a receiving member 124 with a rear end of the cylinder projected from the base plate 103. The shock absorber 123 is swung laterally by means of an external air cylinder 126 connected to the extreme end so that the shock absorber may be fed into the lower side of the annular body 106 when the rotary disk 105 stops and a pressure receiving pin 127 comes into contact with a stop plate 128 projectingly provided on the undersurface of the annular body. It is to be noted that positioning between the neck molds and the molds is accomplished by means of a locating pin as in the prior art. A mold clamping device as indicated at 128' for injection operating stage A comprises three tie bars 129 which are inserted to be movable up and down into base plate 103 and positioned internally and externally of rotary disk 105, a connecting plate 131 for an upper mold clamping plate 130 and a lower end of tie bars, the connecting plate 131 being mounted over the upper ends of the tie bars 129, and a lower mold clamping plate 133 integral with a mold clamping cylinder 132 provided movably up and down on the connecting plate 131. The neck molds and mold closing injection molds are provided on the upper surface of the lower mold clamping plate 123 in a manner similar to that of FIG. 2, and cores which extend through the neck molds and are positioned within the injection molds are mounted on the undersurface of the upper mold clamping plate 130.

The upper mold clamping plate 130 and the base plate 103 are connected by hydraulic cylinders 135 positioned on both sides of the mold clamping plate, and the connecting plate 131 and the lower mold clamping plate 133 are connected by hydraulic cylinders positioned on both sides thereof.

Opening and closing of the mold clamping device 128 is carried out by supplying pressurized oil to the upper hydraulic cylinder 135. When the pressurized oil is supplied to the lower chamber of the upper hydraulic cylinder 135, through a hydraulic passage in each hydraulic cylinder (not shown), the upper mold clamping plate 135 is moved from the position shown in FIG. 6 downwardly along with the tie bars 129 in view of the fact that a piston rod 135a is connected to the base plate 103. Thereby, the connecting plate 131 at the lower end of the tie bar is also moved downwardly but pressurized oil discharged from the upper chamber of the upper hydraulic cylinder 135 moves into the lower chamber of the lower hydraulic cylinder 136 and the piston rod 136a connected to the lower mold clamping plate 133 is moved upwardly to raise the lower mold clamping plate 133. At that time, pressurized oil is supplied into the mold clamping cylinder, and the lower end of a mold clamping ram 132a is slipped out of the connecting plate 131 to complete mold closing. When returning of mold clamping ram 132a is impeded by the plugging-in of a plate 138 connected to a shut-off cylinder 137 on the connecting plate 131, powerful mold clamping is provided by the pressurized oil located within the mold clamping cylinder.

Mold opening can be done by returning the plate 138 to its original position, and thereafter supplying the pressurized oil to the upper chamber of the upper hydraulic cylinder 135. The pressurized oil within the lower chamber flows into the upper chamber of the lower hydraulic cylinder 136 to pull the lower mold clamping plate 133 back onto the connecting plate. At that time, the upper mold clamping plate 130 and the connecting plate 131 also move upwardly together with the tie bars 129. The above-described opening and closing operation is effected by operation of a few valves provided in the hydraulic circuit. Accordingly, mold clamping device 128 is suitable for molding a flat parison wherein the mold opening dimension is small.

Reference numeral 139 designates a stretching blowing device for the stretching blow operating stage C. A mold place plate 140 is inserted into four tie bars 141 hung up internally and externally of the rotary disk 105 from base plate 103 and is moved up and down by means of a hydraulic cylinder 143 provided on a connecting plate 142 at the lower end of tie bars 141.

Reference numeral 144 designates a device installed on the base plate 103 for elevating the stretching rod and for blowing air. A temperature control device 145 is provided on the base plate for temperature control at operating stage B. A mold releasing device 146 is provided on the base plate for mold releasing at operating stage D, and an injection device 147 is also provided.

According to the embodiment constructed as described above, the base plate may be installed above the machine bed such that the tie bars are not used as supporting members whereby the precision of the mold clamping device and of the stretching blow device are enhanced while attaining increased mechanical strength.

Furthermore, since the rotary disk is composed of the annular body comprising ribs alone and the required number of steel plates, the weight of the machine is reduced even while the diameter of the rotary disk is increased. Therefore, the mechanical inertia of rotation and stopping is minimized while the device is at the same time relatively economical.

What is claimed is:

1. A molding machine comprising:
    a machine bed having a substantially horizontal surface for supporting thereon operating stages associated with the molding machine;
    a base plate disposed generally parallel to and above the machine bed plate, the base plate having an undersurface facing the machine bed;
    a plurality of supporting members, extending between the machine bed and the base plate, for supporting the bed plate above the machine bed;
    a rotatable disk rotatably supported at the undersurface of the base plate, the rotatable disk being annularly shaped and defining opening means along a center region thereof, the plurality of supporting members including outer support member means disposed externally to the rotatable disk and inner support member means, passing through the opening means at the center region of the rotatable disk; and
    means for intermittently driving the rotatable disk through a plurality of operational positions.

2. A molding machine of claim 1, wherein the supporting members comprise respective pairs of tie bars constituting the outer and inner support member means, the tie bars further being effective for supporting, vertically above the rotary disk, and guiding mold clamping device associated with an injection operating stage of the molding machine and with a stretching blow operating stage.

3. A molding machine as in claim 1, further including neck molds mounted on the rotatable disk and facing the machine bed, position stops coupled to the neck molds for assisting in stopping the rotatable disk at the plurality of operational positions, and molds arranged between the machine bed and the base plate.

4. A molding machine as in claim 3, in which the driving means includes an annular rack disposed on the rotatable disk and gear means for coupling the annular rack to a driving source.

5. A molding machine as in claim 4, wherein the annular rack is disposed along an outer periphery of the rotatable disk.

6. A molding machine as in claim 4, in which the annular rack is disposed along an inner periphery of the rotatable disk.

7. A molding machine as in claim 2, wherein the rotatable disk comprises an annular body formed of cast iron, a predetermined number of steel plates mounted on an undersurface of said annular body, the annular body having a frame construction which includes an inner ring, an outer ring, and arm means for spacing and interconnecting the rings to one another.

8. A molding machine as in claim 7, including an annular rack disposed on the inner ring and wherein the steel plates are mounted over and between the arm means and extending to the inner and outer rings.

9. A molding machine as in claim 8, including a predetermined number of slots in the steel plates and a predetermined number of insert holes in the base plate, the insert holes and slots being superposed over one another, and further including neck molds disposed on the steel plates, facing the machine bed.

10. The molding machine as in claim 1, wherein the supporting members comprise prismatic members which are arranged in pairs and a frame-like supporting base disposed on the machine bed in a position directly below the center region of the base plate, the tie bars for the mold clamping device being extendable up and down to enable operation of an injection medium operating stage associated with the molding machine.

11. A molding machine as in claim 1, further comprising shock absorber means disposed between the base plate and the rotatable disk.

12. The molding machine of claim 11, wherein the shock absorber means comprises a first cylinder having a rear end rotatably mounted on the base plate, a swing air cylinder connected externally of the extreme end of the first cylinder, and a stop plate projecting from the rotatable disk to contact a pressure receiving pin at the end of the air cylinder.

13. A molding machine as in claim 1, wherein the machine comprises a plurality of operating stages and wherein two sets of operationally identical operating stages are so disposed as to oppose and lie oppositely to one another.

14. A molding machine comprising:
    a machine bed having a substantially horizontal surface for supporting thereon operating stages associated with the mold machine;
    a base plate disposed generally parallel to and above the machine bed, the base plate having an undersurface facing the machine bed;
    a plurality of supporting members, extending between the machine bed and the base plate, for supporting the base plate above the machine bed;
    a rotatable disk rotatably supported at the undersurface of the base plate, the rotatable disk being annularly shaped and defining opening means along a center region thereof, the plurality of supporting members including outer support member means disposed externally to the rotatable disk and inner support member means, passing through the opening means at the center region of the rotatable disk;
    means for intermittently driving the rotatable disk through a plurality of operational positions;
    neck molds mounted on the rotary disk and stopping means on the neck molds, instrumental for stopping the rotary disk at the plurality of operational positions;

the operating stages of the molding machine including an injection stretching blow molding stage;

molds arranged between the machine bed and the base plate;

an annular rack disposed on the periphery of the rotatable disk and gear means for coupling the annular rack to a driving device; and shock absorber means disposed between the bed plate and the rotatable disk, the shock absorber means comprising a first cylinder having a rear end rotatably mounted on the base plate, a swinging air cylinder connected externally of an extreme end of the first cylinder, and a stop plate projecting from a lower side of the rotary disk so as to provide contact with a pressure receiving pin at the end of the swinging air cylinder.

* * * * *